Figure 1:
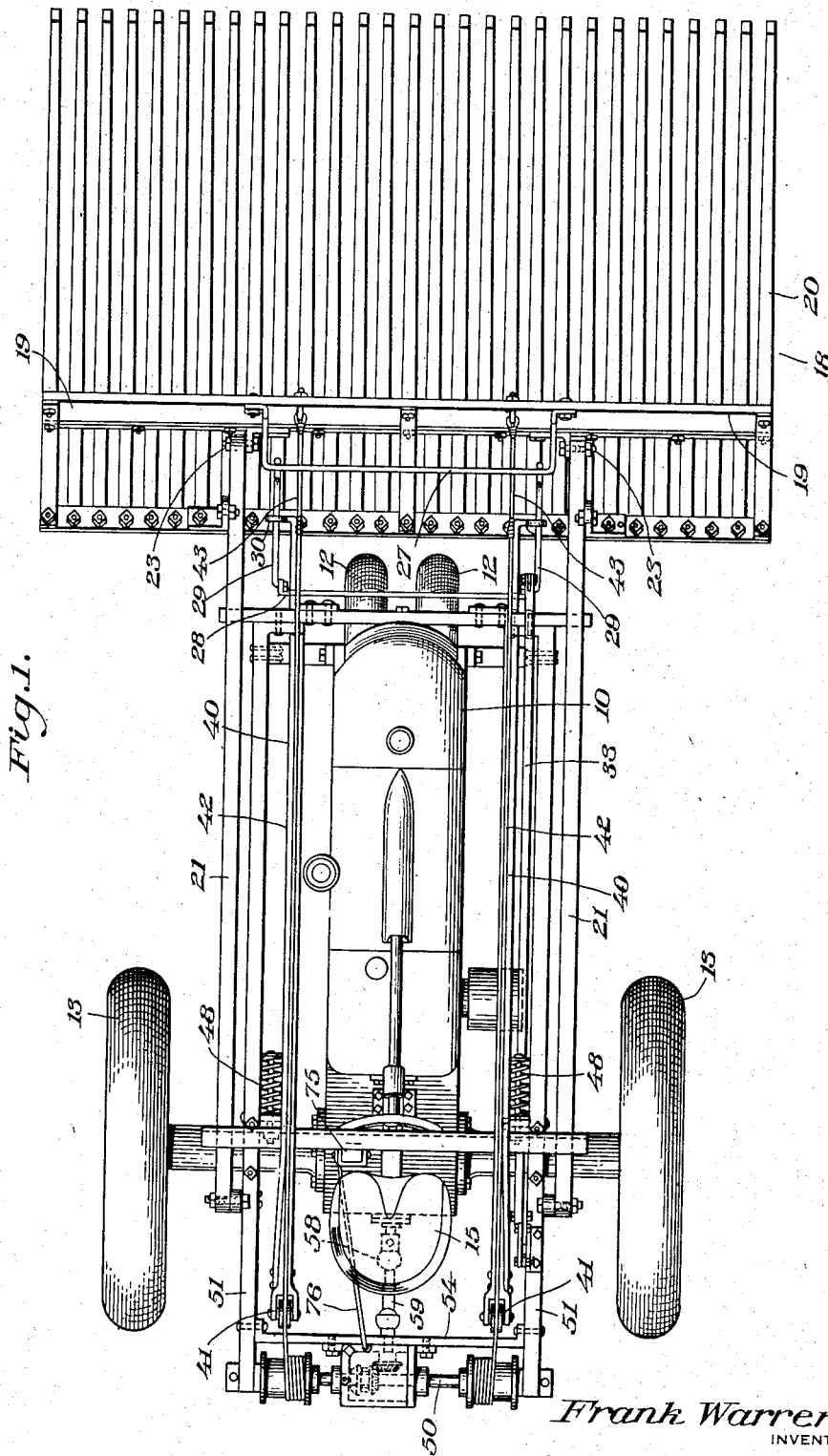

July 18, 1944.   F. WARREN   2,353,949
HAY LOADER
Filed Oct. 12, 1942   2 Sheets-Sheet 1

Frank Warren,
INVENTOR

BY Victor J. Evans & Co.
ATTORNEYS

July 18, 1944.　　　　　F. WARREN　　　　　2,353,949
HAY LOADER
Filed Oct. 12, 1942　　　2 Sheets-Sheet 2
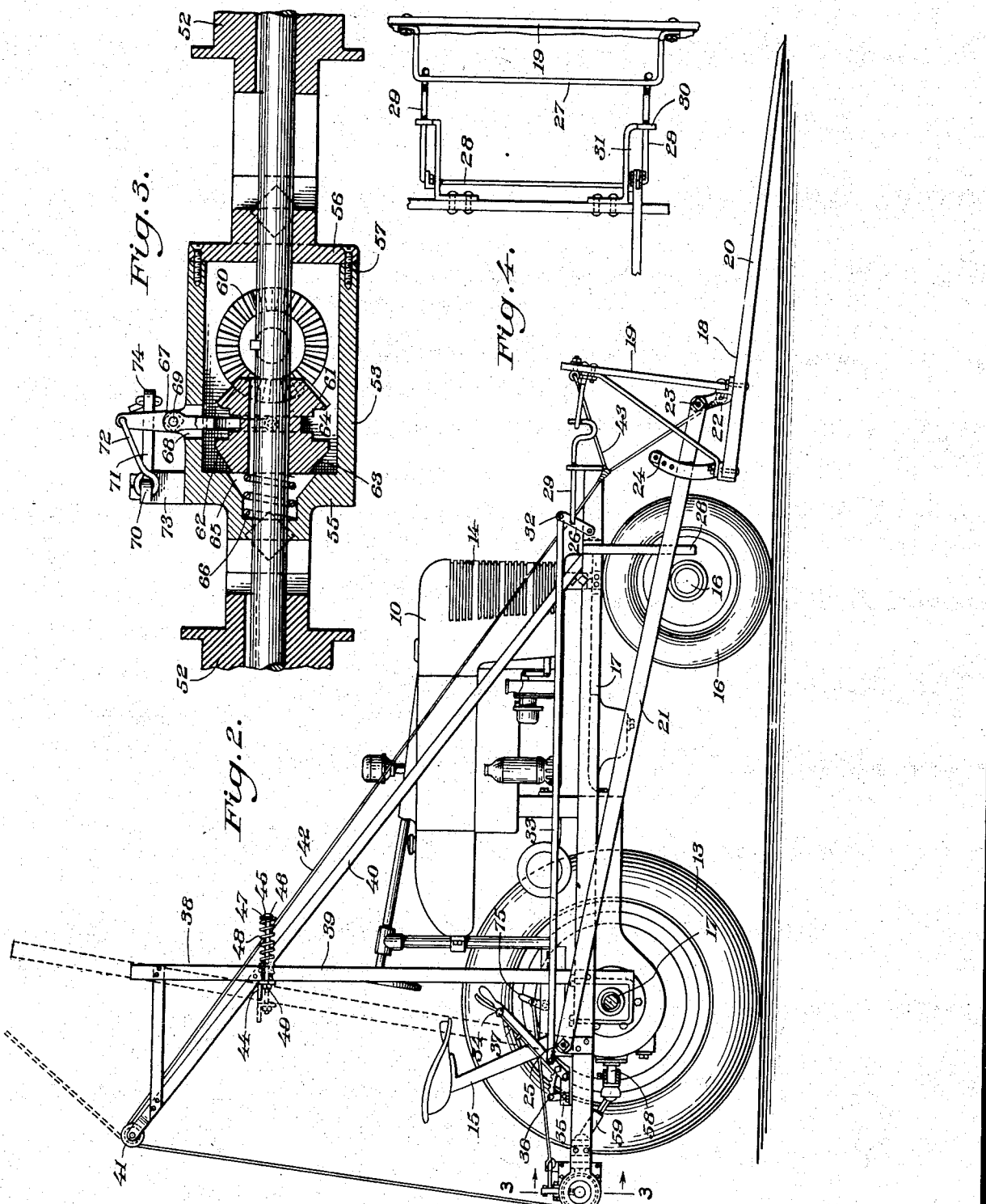
Frank Warren:
INVENTOR
BY Victor J. Evans & Co.
ATTORNEYS Patented July 18, 1944

2,353,949

UNITED STATES PATENT OFFICE 2,353,949

HAY LOADER

Frank Warren, Condon, Oreg.

Application October 12, 1942, Serial No. 461,757

2 Claims. (Cl. 214—131)

My invention relates to new and useful improvements in hay loaders.

An important object of my invention is to provide a hay loader that is uniquely adapted to be mounted on and operated by a tractor in a manner whereby the tractor may be moved to a position for loading the sweep rake and the said rake may thereafter be elevated by power from the tractor to discharge the load upon a stack or into a wagon, or the like, pulled by the tractor.

Another object of my invention is the provision of a device of the above-mentioned character that includes a unique means for limiting the upward swinging movement of the sweep rake and for preventing the same from moving beyond the vertical dead center, whereby to assure the return of the sweep rake to its original position.

Still another object of my invention is the provision of a device of the above-mentioned character that is essentially simple in its construction and efficient in operation, the relatively few parts being of rugged and substantial construction to avoid, as much as possible, all mechanical troubles.

Other objects and advantages of my invention will be apparent during the course of the following description.

In the drawings, forming a part of this specification, and wherein like numerals are employed to designate like parts throughout the same, Figure 1 is a top plan view of a device embodying my invention and showing the same associated with a tractor of conventional design and construction, Figure 2 is a side elevation thereof, Figure 3 is an enlarged vertical sectional view taken on the line 3—3 of Figure 2, and Figure 4 is a fragmentary top plan view of a portion of the device adapted to effect tilting of the sweep rake relative to its supporting arms.

In the accompanying drawings, wherein for the purpose of illustration, is shown a preferred embodiment of my invention, the numeral 10 designates a tractor of conventional design and construction, which tractor includes a supporting frame 11 upon which is mounted the front and rear traction wheels 12 and 13, engine 14 and operator seat 15. In the manner conventional with tractors of this type, the operator seat is located at the rear of the frame 11 and rearwardly of the engine 14. The front traction wheels 12 are rotatably mounted on an axle 16 disposed substantially directly below the front part of the engine and the rear traction wheels 13 are mounted on an axle 17 disposed forwardly of the seat but rearwardly of the engine.

The sweep rake, designated generally by the numeral 18, comprises a plurality of horizontally disposed laterally spaced tines 20 and a plurality of upstanding laterally spaced tines 19. As best illustrated in Figure 2, the upstanding tines 19 are arranged slightly forwardly of the rearward ends of the horizontal tines 20 and a pair of spaced supporting arms 21 are connected to the brackets 22 by the pivots 23, which brackets being carried by the sweep rake directly rearwardly of the upstanding tines. The brackets 24, upstanding from the rearward extremity of the horizontal tines 20, engage with the arms 21 in substantially spaced relation with the pivot pins 23 to normally limit the relative pivotal movement between the sweep rake and the arms. The supporting arms 21 are, in turn, pivotally attached to the frame 11 of the tractor rearwardly of the rear axle 17 by the pivots 25, which supporting arms normally extend forwardly and downwardly in embracing relation with the tractor to rest upon the stops 26 which limit the downward swinging movement thereof. During normal operation of the device the horizontal tines 20 of the sweep rake are also inclined slightly from the horizontal whereby engagement of the supporting arms 21 with the stops 26 will permit the forward extremities of the tines 20 to just touch the surface of the ground.

When it is desired to move the tractor and its appurtenances from one locale to another, it is necessary that the sweep rake be tilted upwardly to provide a substantial clearance between the pointed ends of the horizontal tines and the surface of the ground. For this purpose I have provided a U-shaped rod 27, the opposite ends of which attach to the rear sides of the upstanding tines 19. The laterally spaced arms 29 are slidably received within openings provided in the out-turned ends 30 of the supporting brackets 31 fixedly mounted at each side of the forward end of the tractor frame. The portion of the arms 29 extending forwardly of the supporting brackets are hooked to engage under the rod 27 and the portions of the arms extending rearwardly of the brackets pivotally connect with the arm portions of a U-shaped bar 28, as best illustrated in Figures 2 and 4. The bar 28 is journalled in the brackets 31 and the end of one of the arm portions thereof pivotally connects with a link 33, which link extends rearwardly along the frame and is attached to a manually actuated lever 34 located adjacent the operator seat 15. The last mentioned lever is of conventional design, being pivoted to a supporting bracket 35 which also supports a notched sector 36. The link 33 pivotally connects with the lever above the peripheral edge of the sector and a pawl 37 carried by the lever engages the teeth of the sector to hold the lever in any selected position. Angular movement of the manual lever 34 will act through the medium of the link 33 to rock the bar 28 and rocking of the said bar will reciprocally actuate the arms 29 with the supporting parts 30 of the brackets 31. Reciprocation of the arms 29 will effect angular movement of the sweep rake about the pivots 23 and relative to the supporting arms 21. Obviously, when the lever 34 is in the fully advanced position, the sweep rake will be rocked forwardly so that the tips of the horizontal tines 20 will contact the ground, as illustrated in Figure 2, and when the lever 34 is moved to the fully retracted position, the tines 20 of the sweep rake will be elevated a substantial distance above the ground to permit the entire device to be easily moved from place to place.

The arms 21 rest upon but are not connected to the stop members 26 and inasmuch as they are only connected to the frame by the pivot pins 25, they may be easily moved through a vertical plane. A bumper frame 38 is mounted on the tractor frame and in the path of the rake to limit the upward swinging movement thereof, which frame 38 comprises an upright 39 bolted, or otherwise fixedly attached, at each side of the tractor forwardly of the attached ends of the arms 21. Inclined braces 40 connect with the forward end of the tractor frame and with the upper ends of the uprights 39. The portion of the braces 40 extending beyond the uprights carry pulleys 41, and cables 42, having one end attached to the sweep rake at 43, are reeved through the pulleys 41. Obviously, a pull on the depending portions of the cable will elevate the sweep rake to the dotted line position in Figure 2. During this operation, the U-shaped rod 27 will disengage from the hooked ends of the rod 28 and the supporting arms 21 will rock about the pivot pins 25.

The uprights 39 carry a horizontally positioned bumper bar 44 and the opposite ends of the bar extend substantially beyond the uprights to be disposed in the path of the supporting arms 21. The bumper bar is attached to the uprights by means of the bolts 45 which bolts are of relatively great length, the heads 46 thereof serving as abutments for the washers 47, which in turn provide a seat for one end of the coil springs 48 carried by the bolts. The other end of the springs seat against the confronting face of the uprights 39 and the resilient action thereof will hold the nuts 49 threaded on the bolts in tight pressed relation with the bumper bar.

It should be noted at this point that the bumper bar is disposed rearwardly of the uprights but substantially in advance of and above the pivoted ends of the supporting arms 21. Therefore, the supporting arms will never be permitted to reach a fully vertical position, for as soon as the arms approach such a position, they will strike the bumper bar to compress the springs 48 and the resilient action of the springs will swing the supporting arms downwardly as soon as the actuator cables 42 are released. If the lever 34 is in the normal fully advanced position, the U-shaped rod 27 will be received by the hooked ends of the rod 28 and the arms 21 will drop onto the stops 26 to again operatively position the sweep rake.

In order that the cables 42 may be pulled to elevate the sweep rake, I have provided a shaft 50, the opposite ends of which are journalled for rotation in the brackets 51 attached to and extending rearwardly of the tractor frame 11. The cable drums 52 are fixedly secured to the shaft adjacent the brackets 51 and the depending end of each of the cables 42 is secured to a respective one of the drums. The portion of the shaft extending between the drums passes through a housing 53 which is bolted or otherwise fixedly secured to a transverse brace 54. I have here illustrated the housing as being of essentially cylindrical formation and as being provided with an integral end wall 55 and a removable end wall 56 normally fixedly secured thereto by means of the bolt 57. The power take-off shaft 58 of the tractor is provided with a universal coupling 59, which coupling terminates in a beveled gear 60 disposed within the housing 53. As best illustrated in Figure 3, the coupling 59 extends through the front wall of the housing substantially centrally thereof whereby to position the beveled gear 60 in meshing relation with the gar-like head portion 61 of a sliding clutch member 62 carried by the shaft 50. The clutch member is preferably splined to the shaft 50 whereby it may be easily shifted longitudinally of the shaft but whereby independent rotation thereof relative to the shaft is positively prevented. The clutch element is formed with a head portion 61 and 63 at each end thereof and with an annular groove 64 intermediate the said head portions. As hereinabove described, the head portion 61 is in the nature of a beveled gear, the teeth of which are adapted to engage with the teeth of the beveled gear 60 when the clutch member is shifted along the shaft to effect such engagement. The head portion 63 of the clutch element is of essentially frusto-conical shape, but the beveled surface is plane and adapted to be received within a similarly shaped opening 65 in the integral end wall of the housing. A coil spring 66 disposed within the opening 65 normally bears against the clutch element to urge the head 61 into meshed relation with the beveled gear 60.

It may thus be seen that when the power take-off of the tractor is rendered operative, the gear 60 will be rotated and that the rotation of the gear will be imparted to the clutch member. By reason of the splined engagement of the clutch member with the shaft 50, the shaft will rotate the drums 52 in a direction to wind the cables 42 therearound.

In order that the clutch member 62 may be easily shifted into or out of engagement with the gear 60, I have provided a manual actuator means that includes a lever 67 which extends through an opening 68 in the housing and is pivotally supported in the opening by means of the pin 69. The portion of the lever extending into the housing is bifurcated and each of the bifurcations extend into the annular groove 64. The pivot pin 69 extends in a plane containing the groove 64 whereby the rocking of the lever 67 about its pivot will effect sliding of the clutch member relative to the shaft 50. The portion of the lever extending from the housing is connected to the arm 70 of a bell crank 71 by means of a link 72. The bell crank is rockably mounted on the upstanding integral portion 73 of the housing 53 and the arm 74 thereof is connected to a foot pedal 75 by means of the connecting rod 76. The foot pedal 75 is preferably disposed slightly in advance and at one side of the operator seat 15 whereby to be readily accessible to the operator. If the foot pedal is depressed the rocker arm will be moved to pivot the lever 67 in a direction to slide the clutch member away from the gear 60 and as soon as the pedal is released, the resilient action of the coil spring 66 will again shift the clutch member into meshed engagement with the power take-off gear.

In operation, the tractor is maneuvered in a manner whereby the sweep rake is driven into a shock of hay, or the like. During this operation, the parts are positioned in the manner illustrated by the full lines in Figure 2 whereby the horizontal tines 20 of the sweep rake will pass under the shock of hay and whereby as the tractor is moved forwardly, the hay will be pushed along the horizontal tines and against the upstanding tines 19. If the pedal 75 is released to permit the coil spring 66 to effect engagement of the gears 60 and 61 and if the power take-off is connected to the engine of the tractor, the shaft will be rotated to wind the cables 42 about the drums 52. As the sweep rake is raised to the dotted line position in Figure 2, the shock of hay will be transferred from the tines 20 to the tines 19 and as the arms 21 strike against the bumper bar 44, the inertia of the hay will cause the hay to be thrown back over the driver's head and on to a stack or into a wagon pulled by the tractor. As soon as the arms 21 engage the bumper bar, the operator depresses the foot pedal 75 to shift the head portion 63 of the clutch member into the opening 65 and to disengage the teeth of the head portion 61 from the power take-off gear 60. The frictional engagement of the head portion 63 with the wall of the opening 65 will prevent the arms 21 from being lowered too rapidly and the operator, by regulating the degree of frictional engagement between the clutch member and the confronting wall, may regulate the speed at which the sweep rake will be lowered onto the stops 26. The manner in which the bumper bar 44 is positioned forwardly of the pivoted ends of the sweep rake arms 21 will prevent the arms from swinging beyond vertical dead center and will assure the return of the sweep rake to the original position after each actuation thereof. The springs 48 of the bumper bar unit will absorb the shock as the arms 21 strike against the bar and will react to reverse the motion of the arms in a manner to return the same to the initial lowered position.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. In combination with a vehicle having a power take-off, a driven means operatively connected with the power take-off, said driven means comprising a housing receiving the power take-off, a shaft mounted for rotation in the housing, drums fixed to the shaft, and a clutch element mounted for sliding movement on the shaft, said clutch element including a gear portion adapted to coact with the power take-off to effect rotation of the shaft and an internal brake portion adapted to press against a confronting stationary surface to retard the speed of rotation of the shaft, manual means for shifting the clutch member along the shaft in a manner to move either the gear portion into engagement with the power take-off or to disengage the gear therefrom and to move the internal brake portion thereof into pressed frictional engagement with the said stationary surface, a rake element arranged in advance of the vehicle having supporting arm portions pivotally connected at the rear of the vehicle, means connecting the driven means and rake whereby actuation of the driven means will swing the rake upwardly, and a bumper bar disposed in the path of the rake element and slightly in advance of the pivoted ends of the supporting arm portions for preventing the rake from swinging beyond vertical dead center.

2. In combination with a vehicle having a power take-off, a driven means operatively connected with the power take-off, said driven means comprising a housing receiving the power take-off, a shaft mounted for rotation in the housing, drums fixed to the shaft, a clutch element mounted for rotation with the shaft but being slidable thereon, said clutch element including a gear portion adapted to coact with the power take-off to effect rotation of the shaft and an internal brake portion adapted to press against a confronting stationary surface to retard the speed of rotation of the shaft and spring means for normally holding the gear portion of the clutch element in meshed relation with the power take-off, manual means for shifting the clutch member along the shaft to move either the gear portion in engagement with the power take-off or to disengage the gear portion therefrom and to move the internal brake portion thereof into pressed frictional engagement with the said stationary surface, a rake element arranged in advance of the vehicle having supporting arm portions pivotally connected at the rear of the vehicle, means connecting the driven means and rake whereby actuation of the driven means will swing the rake upwardly, and a bumper bar disposed in the path of the rake element and slightly in advance of the pivoted ends of the supporting arm portions for preventing the rake from swinging beyond vertical dead center.

FRANK WARREN.